(12) United States Patent
Sorensen (10) Patent No.: US 6,556,251 B1
(45) Date of Patent: Apr. 29, 2003

(54) APPARATUS AND METHOD FOR RECEIVING AND COMBINING DIGITAL BROADCAST DATA WITH AN ANALOG COMPOSITE SIGNAL

(75) Inventor: Tom Lee Sorensen, Naperville, IL (US)

(73) Assignee: Zenith Electronics Corporation, Glenview, IL (US)

(*) Notice: Subject to any disclaimer, the term of this patent is extended or adjusted under 35 U.S.C. 154(b) by 0 days.

(21) Appl. No.: 09/478,138

(22) Filed: Jan. 5, 2000

(51) Int. Cl.[7] .......................... H04N 5/445; H04N 5/45; H04N 5/455
(52) U.S. Cl. .................. 348/564; 348/565; 348/731; 348/726; 348/598
(58) Field of Search ................................ 348/564, 565, 348/734, 726, 731, 563, 584, 588, 598, 705, 706; H04N 5/445, 5/45, 5/44, 5/455, 9/74, 5/268

(56) References Cited

U.S. PATENT DOCUMENTS

| | | | | |
|---|---|---|---|---|
| 5,946,047 A | | 8/1999 | Levan | 348/473 |
| 6,091,458 A | * | 7/2000 | Jeon et al. | 348/706 |
| 6,115,080 A | * | 9/2000 | Reitmeier | 348/731 |
| 6,137,546 A | * | 10/2000 | Shintani et al. | 348/731 |
| 6,313,886 B1 | * | 11/2001 | Sugiyama | 348/731 |

* cited by examiner

Primary Examiner—Sherrie Hsia
(74) Attorney, Agent, or Firm—Schiff Hardin & Waite (57) ABSTRACT

An analog television is digitally enabled so that both analog video received in an analog broadcast signal and data received in data packets of a digital broadcast signal can be displayed on the same display. The analog television is digitally enabled by including digital television tuning and demodulation equipment either in the cabinet of the analog television or in a set top box coupled to the analog television.

29 Claims, 5 Drawing Sheets

APPARATUS AND METHOD FOR RECEIVING AND COMBINING DIGITAL BROADCAST DATA WITH AN ANALOG COMPOSITE SIGNAL

TECHNICAL FIELD OF THE INVENTION

The present invention relates to an apparatus and method that enables a user to download digital data from a digital broadcast signal and to combine the data with an analog composite television signal for display.

BACKGROUND OF THE INVENTION AND PRIOR ART

The ATSC digital broadcast standard for digital television allows for the transmission of 19 Mbits/sec in an RF channel having a 6 MHZ bandwidth. Although this allocated bandwidth is adequate for a single analog NTSC television channel, the ATSC bit rate permits the same channel to support the concurrent transmission of several standard definition television (SDTV) programs (i.e., programs displayable with a resolution comparable to that of the NTSC analog program). Alternatively, the allocated bandwidth at the ATSC bit rate permits a channel to support the transmission of a single high definition television (HDTV) program at a time. Moreover, the ATSC digital broadcast standard permits data to be transmitted in the channel along with digital programming. Therefore, data packets may be multiplexed in the channel with video and audio program packets.

In contrast, the NTSC analog broadcast standard for analog television allocates bandwidth within the vertical blanking interval for the transmission of data with an analog television broadcast program. However, the bandwidth allocated within the vertical blanking interval of an NTSC signal is minimal compared to the amount of bandwidth available in an ATSC digital broadcast signal for the transmission of digital data.

In light of the greater bandwidth available in an ATSC broadcast signal, an ATSC signal can support the transmission of greater amounts of data than can the NTSC signal. However, conventional analog televisions, that are capable of receiving and displaying an analog NTSC signal, are incapable of receiving a digital broadcast signal. Therefore, the consumer having an analog NTSC television is not able to receive the data being transmitted in the digital broadcast signal. Moreover, even if such data could be received from a digital broadcast signal by an analog television, conventional analog televisions are not equipped to combine digital data with an analog composite television signal for display to the television consumer.

The present invention is directed to a method and apparatus that enables the reception of digital data transmitted in a digital broadcast signal and the combination of such data with an analog composite television signal for display.

SUMMARY OF THE INVENTION

In accordance with one aspect of the present invention, a television system includes an analog tuner that tunes to an analog programming signal and an analog signal demodulator coupled to the analog tuner that demodulates the analog programming signal. The system further includes a digital tuner that tunes to a digital programming signal and a digital signal demodulator coupled to the digital tuner that demodulates the digital programming signal. In addition, a display is coupled to the analog and digital signal demodulators and displays analog programming contained in the demodulated analog programming signal, and further displays data as contained in one or more digital data packets transmitted in the digital broadcast signal.

In accordance with another aspect of the present invention, the analog broadcast signal has both an analog programming signal component and an analog information signal component that includes information pertaining to a digital channel from which the one or more digital packets may be extracted. The analog information signal component further includes information pertaining to an identifier for identifying the one or more digital data packets to be extracted from the digital broadcast signal.

In accordance with yet another aspect of the present invention, a television system is provided wherein both an analog program signal and an digital program signal are received and wherein an analog program is extracted from the analog program signal and is displayed on a display, and further wherein data are extracted from the digital program signal and are displayed on the display.

In accordance with a still further embodiment of the present invention, a method for receiving a digital broadcast signal and for combining the digital broadcast signal with an analog broadcast signal includes the steps of: a) tuning to and receiving the analog broadcast signal; b) demodulating the analog broadcast signal; c) tuning to and receiving the digital broadcast signal; d) demodulating the digital broadcast signal; e) separating a digital data packet from the digital broadcast signal; f) formatting data contained in the digital data packet for display, thereby generating a formatted data signal; g) combining the formatted data signal with the demodulated analog broadcast signal thereby to form a combined signal; and h) supplying the combined signal to a display for display thereon.

The method may further includes the steps of i) separating an analog information signal from the analog broadcast signal; j) using information contained in the analog information signal to select a channel to which the digital tuner is to be tuned in step c); and k) using information contained in the information signal to identify the data packet to be separated from the digital broadcast signal in step e). The steps i) and j) are to be performed between the steps c) and d) and the step k) is to be performed between the steps d) and e).

BRIEF DESCRIPTION TO THE DRAWINGS

The features and advantages of the present invention will become more apparent from a detailed consideration of the invention when taken in conjunction with the drawings in which.

DESCRIPTION OF THE PREFERRED EMBODIMENT

Figure 1:
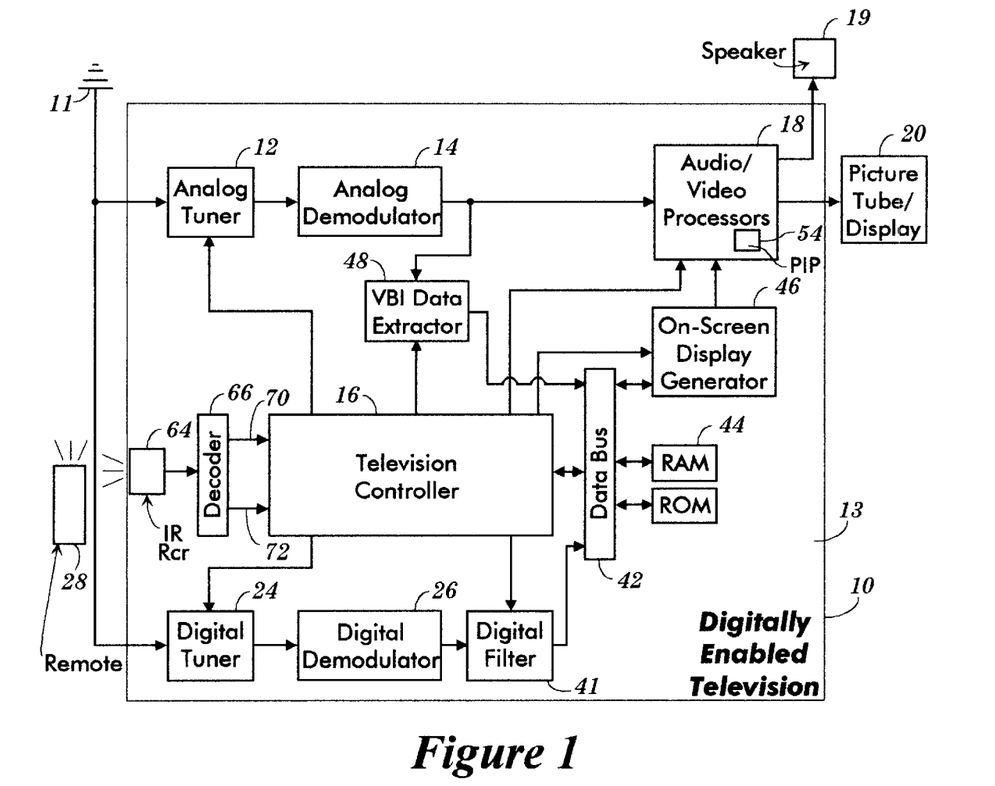
FIG. 1 illustrates a digitally enabled analog television according to one embodiment of the present invention.

Referring now to the drawings, wherein like reference numerals designate identical or corresponding parts throughout the several figures, and more particularly to FIG. 1, a digitally enabled analog television 10 has conventional analog television components including an antenna 11 coupled to an analog tuner 12, an analog signal demodulator 14, a television controller 16, a set of video and audio processors 18, an audio speaker 19 and a picture tube/display 20. The digitally enabled television 10 also includes a digital tuner 24 coupled to the antenna 11 and further coupled to a digital signal demodulator 26. The digital tuner 24 is additionally coupled to and controlled by the television controller 16. It is to be understood that the digitally enabled television 10 may include a cabinet 13 within which the components associated with the television 10 are disposed.

Figure 2:
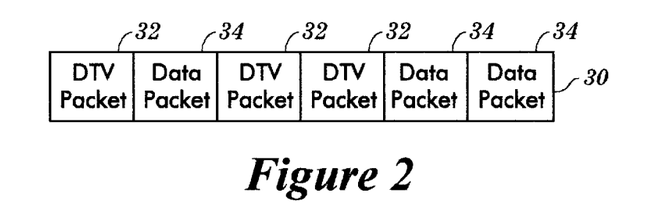
FIG. 2 illustrates a sample portion of a digital vestigial sideband (VSB) signal having a set of digital programming packets multiplexed with a set of data packets.

The digital tuner 24 may be tuned to any desired RF channel within the bands allocated to the digital tuner 24, including, for example, any of the RF channels in any of the bands allocated for digital television viewing. In operation, the television controller 16, in response to a control signal generated at a remote control 28, controls the digital tuner 24 causing it to tune to a digital broadcast signal such as a digital vestigial sideband (VSB) broadcast signal which is defined to include any of a 2 VSB, a 4 VSB, an 8 VSB, an 8T VSB or a 16 VSB signal, transmitted via one of the RF channels. Referring also to FIG. 2, which illustrates a sample portion of a digital VSB broadcast signal 30 to which the digital tuner 24 may be tuned, the VSB broadcast signal 30 includes a set of digital television (DTV) programming packets 32, having audio and/or video components, multiplexed with a set of data packets 34. The DTV programming packets 32 and data packets 34 are both formatted in conformance with the ATSC standard and thus have symbols and symbol rates as specified therein.

Figure 3:
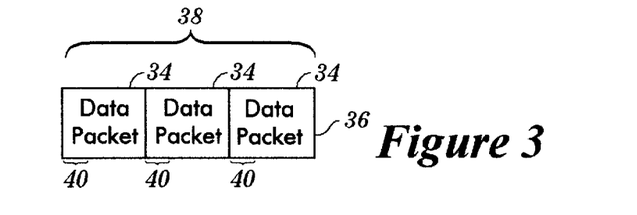
FIG. 3 illustrates a set of three data packets that form a datastream wherein the datastream represents a data module.

Referring also to FIG. 3, the data packets 34, once they have been separated from the DTV programming packets 32, form a datastream 36 that comprises a data module 38. The datastream 36 of FIG. 3 is only intended to be representative such that, although three data packets 34 form the datastream 36, any number of data packets 34 may instead be used to form the datastream 36. Likewise, the data stream 36 may comprise any number of data modules 38. In accordance with the ATSC standard, the data modules 38 are identifiable via a pre-defined sequence of packet identification bits [not shown in detail] residing at a location in the data packet 34 allocated as a header 40.

Referring still to FIGS. 1, 2 and 3, the television controller 16 causes the digital tuner 24 to tune to the digital VSB broadcast signal 30. The digital VSB broadcast signal received at digital tuner 24 is transmitted to the digital signal demodulator 26 which proceeds to demodulate the digital VSB broadcast signal 30. The demodulated signal is then transmitted to a digital signal filter 41 which demultiplexes the demodulated signal and searches the data packets 34 contained therein for a specific data module 38 by comparing the header 40 of each incoming data packet 34 to a pre-defined packet identification bit sequence that identifies the data module 38. The pre-defined packet identification bit sequence for which the digital signal filter 41 searches is supplied to the digital signal filter 41 by the television controller 16. Upon identifying one or more data packets having the pre-defined packet identification bit sequence associated with the data module 38, the identified data packets are passed via a data bus 42 to a memory which may be implemented with, for example, a random access memory (RAM) 44. While in the RAM 44, the data packets 34 may be examined by the television controller 16 for errors. If no errors are detected, the data packets 34 are retained in the RAM 44. If, instead, an error is detected, the television controller 16 may cause the data packets 34 to be discarded. As will be understood by one having ordinary skill in the art, the data module 38 may be transmitted by a digital television provider [not shown] periodically at selected times during the day and may further be transmitted repeatedly at convenient intervals. Thus, in the event that an error is detected, the television controller 16 may cause the digital signal filter 41 to continue monitoring the incoming datastream 36 for a later transmission of the desired data packets 34.

The data module 38 may include, for example, any data of interest to the consumer such as information related to the content of a television program and/or channel guide information.

Referring again to FIG. 1, once the data module 38 of interest has been identified by the television controller 16, the television controller 16 causes the data module 38 to be transmitted from the RAM 44 to an on-screen display generator 46 which, under control of the television controller 16, formats the data module 38 for display.

The video and audio processors 18 receive the data module 38 formatted for display from the on-screen display generator 46 and combine the formatted data with an analog composite television signal received from the analog signal demodulator 14. The analog signal demodulator 14, in turn, receives the analog signal from the analog tuner 12, as occurs in a conventional analog television. The demodulated analog signal exiting the analog demodulator 14 is also supplied to a vertical blanking interval data extractor 48 which filters the analog broadcast signal to extract data therefrom. More particularly, the analog broadcast signal includes a component having analog broadcast programming and a component having analog broadcast data. The analog broadcast data is transmitted at a known location in the vertical blanking interval (VBI) of the analog broadcast signal and the VBI data extractor 48 extracts the data transmitted therein. The data extracted by the VBI data extractor 48 is converted to a digital format and then may be transferred to the RAM 44 via the data bus 42 or to the on-screen display generator via the data bus 42 wherein the data is formatted for subsequent display. Note that because the analog broadcast data is transmitted at a known location in the vertical blanking interval, the filter can locate the data without the assistance of the television controller 16. If, instead, the analog broadcast data is transmitted at a varying and, therefore, unknown location, the filter may be informed of the location of the data via the television controller 16.

In addition, the data transmitted in the VBI of the analog broadcast signal may include information that identifies data being transmitted in the digital broadcast signal. For example, the data transmitted in the VBI may include information that identifies a channel on which the digital data is being transmitted and may further identify a packet identification bit sequence that identifies a data module of interest. In response to such information retrieved from the VBI of the analog broadcast signal, the television controller 16 may be programmed to cause the digital tuner 24 to tune to the identified channel and may supply the data packet identification bit sequence to the digital filter 41 so that the filter extracts the desired data module 38.

Figure 4:
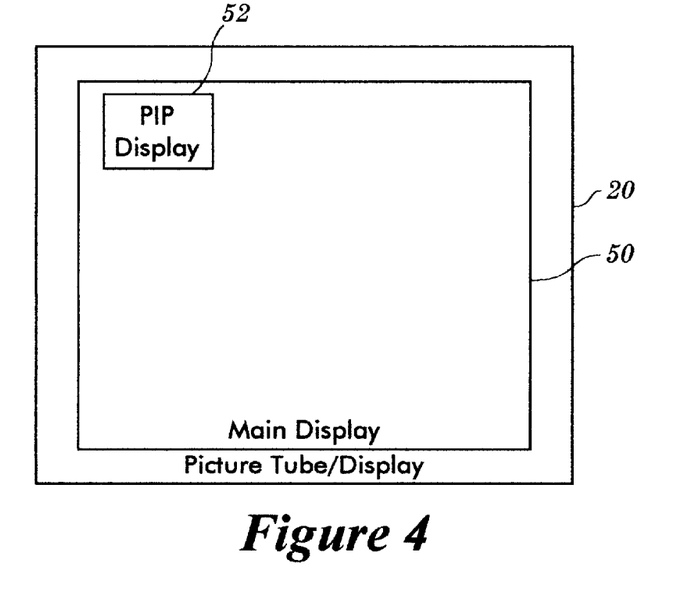
FIG. 4 illustrates a display having a main display and a picture-in-picture display either of which may be used to display the digital data downloaded by the digitally enabled analog television in accordance with the present invention.

Referring also to FIG. 4, the video processors 18, which are also controlled by the television controller 16, may overlay the formatted data on all or a portion of a main display 50 thereby fully or partially replacing display of the analog composite television signal. Alternatively, the video processors 18 may generate a PIP display wherein a PIP screen 52 contains the data display and the main display 50 contains the display of the analog composite television signal or vice versa. As will be understood by one of ordinary skill in the art, to enable display of the digital data in a PIP screen 52 display, the video processors 18 include a PIP module 54 and PIP circuitry necessary to effect such a display. Moreover, the formatted data displayed in the PIP display 52 and the analog composite television signal displayed in the main display 50 may be swapped as desired by the viewer through the use of the remote control 28, as described further hereinafter.

Alternatively, instead of transmitting the data packets 34 retrieved from the digital broadcast signal 30 to the on-screen display generator 46 for immediate display, the data packets may instead be transmitted to the RAM 44 for retrieval and display at a later time.

Figure 5:
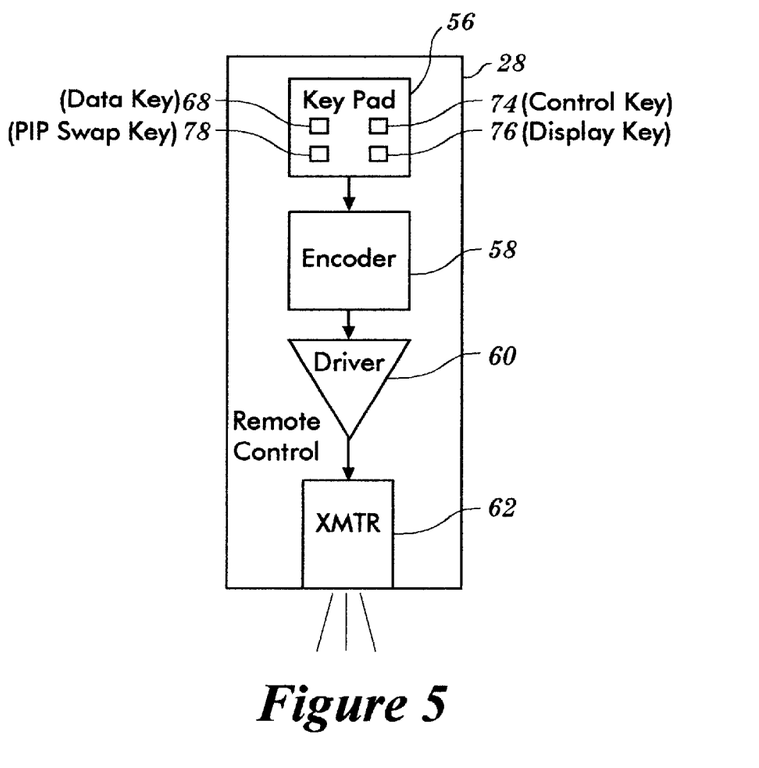
FIG. 5 illustrates a remote control for controlling the digitally enabled analog television in accordance with the present invention.

Referring now to FIGS. 1 and 5, the remote control 28 has dual tuning capabilities to enable control of both the digital tuner 24 and the analog tuner 12. More particularly, remote control 28 includes a keypad 56 having a set of keys disposed thereon, an encoder 58, a driver 60 and an infra-red (IR) transmitter 62 coupled to the driver 60. When a viewer selects a channel for viewing, the keypad 56 transmits a channel selection signal to the encoder 58 which encodes the signal and sends the encoded signal to the driver 60 for subsequent transmission to the transmitter 62. The transmitter 62 delivers the IR signal to an IR receiver 64 disposed within the digitally enabled analog television 10 which sends the signal to a decoder 66 for decoding and for subsequent delivery to the television controller 16. Instead of the transmitter 62 transmitting the control signals via an infra-red frequency, the remote control 28 of the present invention may instead transmit signals via a radio frequency transmission, or an ultrasonic signal transmission and/or the like, provided, of course, that the IR receiver 64 is replaced with a like receiver.

To differentiate between a channel select signal intended for the digital tuner 24 and a channel select signal intended for the analog tuner 12, the remote control 28 includes a data key 68 among the keys on the keypad 56, which is pressed by the viewer prior to making a digital channel selection. Pressing the data key 68 causes the encoder 58 to encode the channel selections that follow in a manner that identifies the channel selections as intended for the digital tuner 24. The data key 68 also acts as a toggle switch in that, in order to return to selecting an analog channel for viewing, the viewer again presses the data key 68 thereby causing the encoder 58 to encode the channel selections that follow in a manner that identifies the channel selections as intended for the analog tuner 12. The decoder 66 residing in the digitally enabled analog television 10 decodes the received channel selection signals and provides the channel selection signals intended for the digital tuner 24 to the television controller 16 on a set of data lines 70 and further provides the channel selection signals intended for the analog tuner 12 to the television controller 16 on a set of data lines 72. The television controller 16 distributes the received channel selections to the appropriate tuner accordingly.

The keypad 56 of the remote control 28 may further include a key 74 that enables the simultaneous control of the digital tuner 24 and the analog tuner 12 such that a single channel selected by the viewer after the key 74 is pressed causes the television controller to cause both of the analog and digital tuners 12 and 24 to tune to the channel selected.

In addition, the remote control 28 further includes a display key 76 among the keys on the keypad 56. The display key 76 enables control of the format used to display the data. More particularly, the display key 76 may be used to cause the formatted data to appear in the PIP screen 52 and the display of the analog composite television signal in the main display 50, and may be used to cause the formatted data to be overlaid on all or a portion of the main display 50 thereby fully or partially replacing the display of the analog composite television signal. To cause the formatted data to appear in the PIP screen 52 format (see FIG. 4), the display key 76 is depressed thereby generating a display control signal that causes the data to appear in the PIP screen 52 while the display of the analog composite television signal appears in the main display 50. To cause the data to appear in the main display 50 such that it completely or partially overlays the analog composite television signal, the display key 76 is depressed twice. To cause the data display appearing in the PIP screen 52 to appear in the main display 50, and the analog composite television signal to appear in the PIP screen 52, a PIP Swap key 78 disposed on the remote control 28 is depressed. Depressing the display key 76, either once or twice, causes a display control signal to be generated, encoded and transmitted in the same manner as a control signal generated by a channel selection. Likewise, depressing the PIP swap key 78 causes a swap control signal to be generated, encoded and transmitted in the same manner as a control signal generated by a channel selection. The transmitted signal is then received at the IR receiver 64 disposed at the digitally enabled analog television 10 and subsequently delivered to the decoder 66 and to the television controller 16. Thereafter, the television controller 16 responds to the display control signal and/or PIP swap control signal by causing the on-screen display generator 46 to format the data accordingly and further by causing the video processors 18 to combine the formatted data with the analog composite television signal appropriately.

Of course, it will be understood by one of ordinary skill in the art that the various display formats may be selected using any number of methods including, for example, depressing a toggle key (not shown) that causes the display format to switch between the main display format and the PIP display format with each successive press of the key.

As described hereinbefore, instead of tuning to a digital broadcast channel selected by the viewer at the remote control 28, the television controller 16 may tune the digital tuner according to information transmitted in the VBI of the analog broadcast signal and may extract data packets 34 that are identified according to a packet identification bit sequence also transmitted in the analog broadcast signal.

Figure 6:
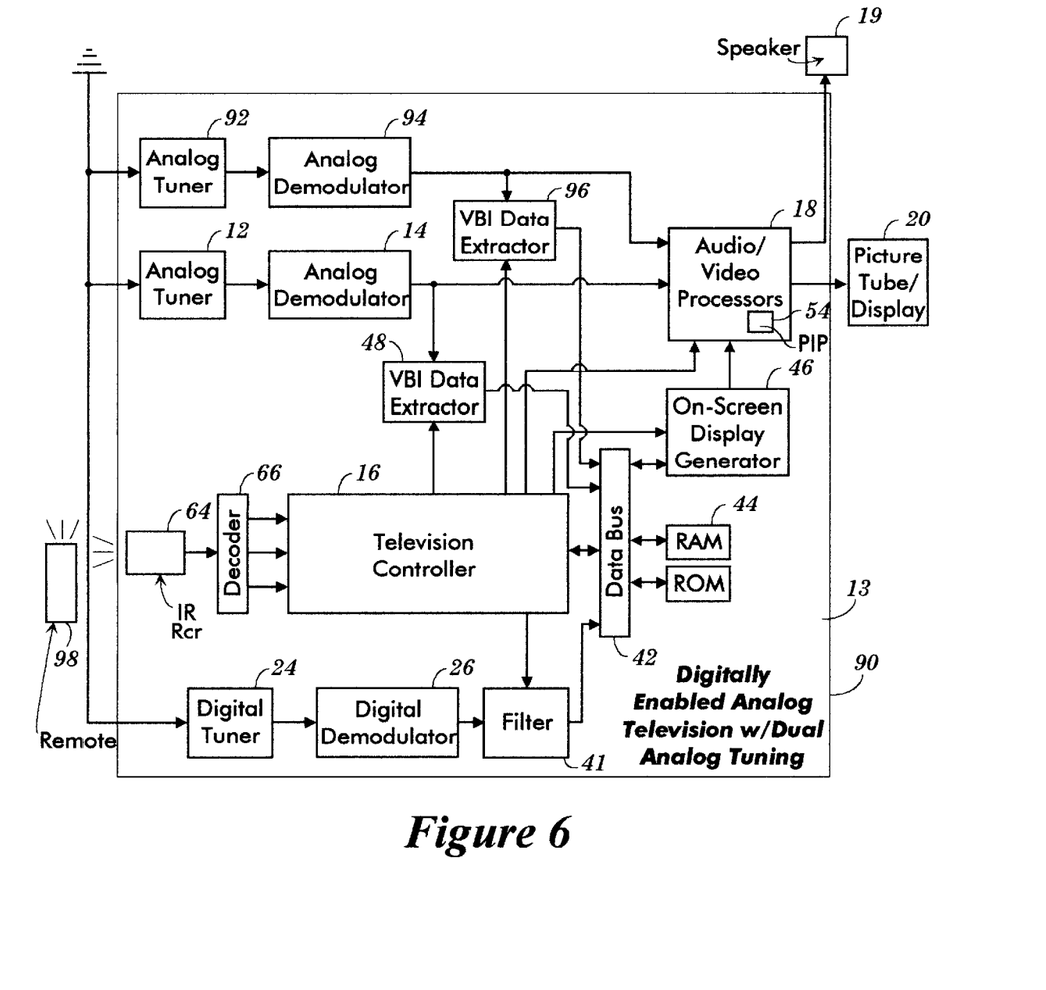
FIG. 6 illustrates a digitally enabled analog television having dual analog tuning capabilities in accordance with another embodiment of the present invention.

Referring now to FIG. 6, in another embodiment of the present invention, a digitally enabled analog television 90 having dual analog tuning capabilities is provided. The television 90 has components like those of the television 10 of FIG. 1, as is shown using identical numerals to designate identical components, with the addition of a second analog tuner 92, a second analog demodulator 94 and a second VBI data extractor 96.

The additional components enable the reception and display of a second analog broadcast composite television signal simultaneously with the reception and display of the first analog broadcast composite television signal processed by the analog tuner 12 and the analog demodulator 14. Thus, the television 90 may be used to view a first analog television program in the main screen 50, a second analog television program in the PIP screen 52 and a set of digital data overlaid on a portion of either the main display 50 or PIP screen 52, or any combination thereof.

As will be understood by one having ordinary skill in the art, to enable control of the digitally enabled analog television 90, a remote control 98 has the same components and features as the remote control 28 of FIG. 5 with minor modifications to allow for the encoding/decoding of a set of control signals intended for the analog tuner 92. In addition, the remote control 98 may include extra keys to effect control of the analog tuner 92 and to effect display of the signal received at the analog tuner 92.

Figure 7:
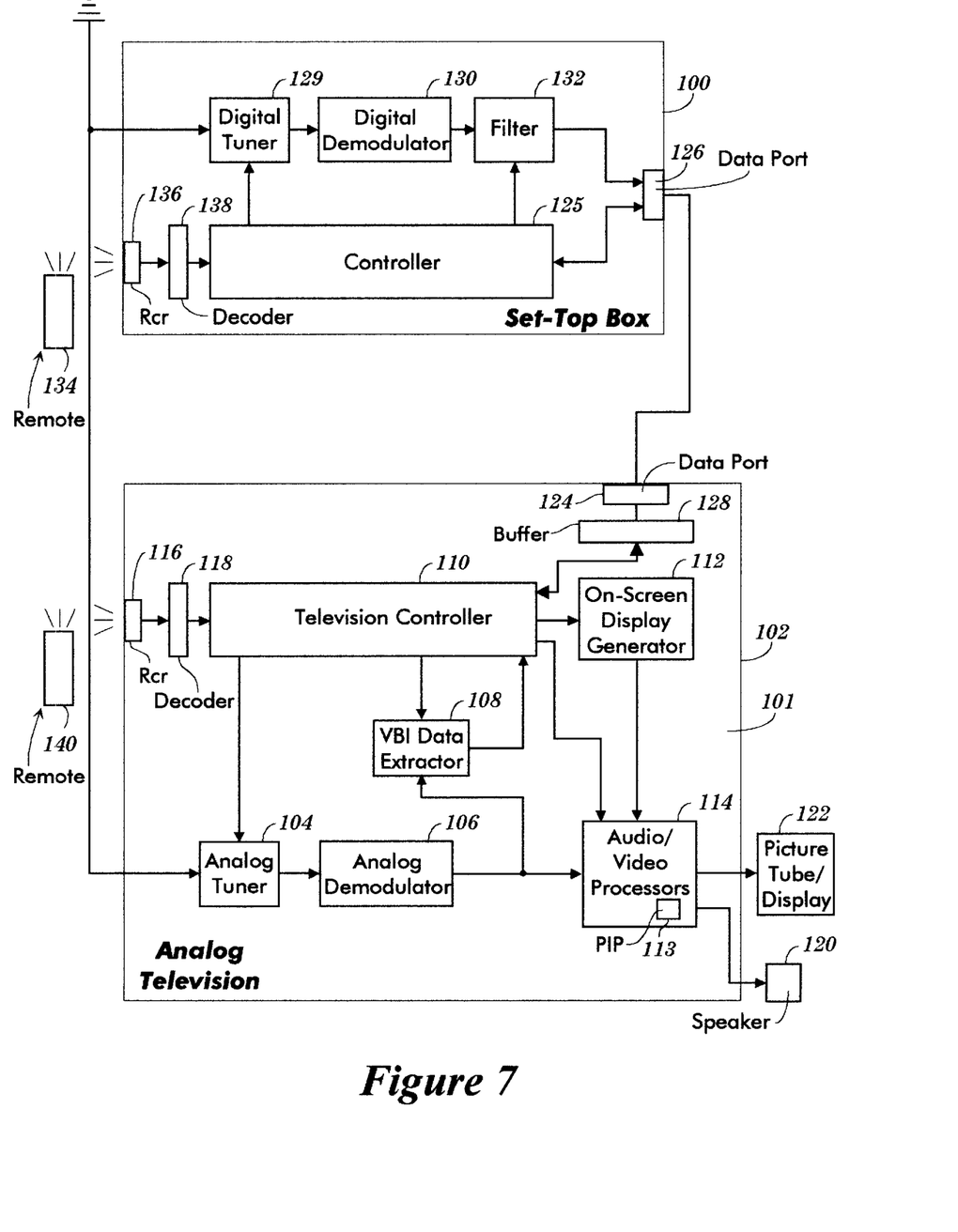
FIG. 7 illustrates a set top box that enables the reception and display of digital data at an analog television in accordance with yet another embodiment of the present invention.

Referring now to FIG. 7, in yet another embodiment of the present invention, a set top box 100 which may be formed of a cabinet or other housing, enables the reception and display of data transmitted in a digital broadcast signal on an analog television 102. The analog television 102 has components similar to those found in a conventional analog television including an analog tuner 104, an analog demodulator 106, a VBI data extractor 108, a television controller 110, an on-screen display generator 112, a set of video/audio processors 114 and a remote control signal receiver 116. Additionally, the television 102 may, but need not, include a remote control signal decoder 118 that decodes remote control signals received at the receiver 116, and that transmits the decoded control signals to the television controller 110. A set of one or more speakers 120 and a picture tube/display 122 may also be disposed within the television 102 or may otherwise be associated therewith. The components disposed within the analog television 102 operate in much the same way as do the components of a conventional analog television. As with the television 10 of FIG. 1, it is to be understood that the television 102 may include a cabinet 101 within which the components associated with the television 102 are disposed.

To enable the reception of digital data at the analog television 102, the analog television 102 includes a serial data port 124 having a buffer 128 coupled thereto. The serial data port 124 is further coupled to a serial data port 126 disposed within the set top box 100. The set top box 100 further includes a digital tuner 129, a digital demodulator 130 and a digital signal filter 132. The digital tuner 129 tunes to a selected channel in response to a control signal delivered by a controller 124. The digital broadcast signal received by the digital tuner 129 is then transmitted to the digital demodulator 130 which demodulates the signal and thereafter sends the demodulated signal to the digital signal filter 132. The digital signal filter 132 monitors the incoming demodulated digital broadcast signal for a pre-defined data packet identification bit sequence that corresponds to a desired data module 38. The pre-defined data packet identification bit sequence associated with the desired data module 38 is supplied by the controller 124. When a set of one or more data packets 34 having the proper pre-defined data packet identification bit sequence have been identified, they are transmitted to the serial data port 126 for subsequent transmission to the serial data port 124 of the analog television 102.

After being received at the serial port 124, the data signal is transferred to the buffer 128 and then to the television controller 110. The television controller 110 then causes the data signal to be transferred to the on-screen display generator 112 for formatting therein. After the data signal is formatted for display it is transmitted to the video processor 114 where it is combined with an analog broadcast composite television signal. Thereafter, the combined signal is sent to the picture tube/display 122 for display thereon.

Alternatively, the serial data port 124 and buffer 128, instead of being coupled to the television controller 110, or, in addition to being coupled to the television controller 110, may be coupled to a random access memory (not shown) disposed in the analog television 102 such that the digital data supplied by the set top box 100 could be stored in the analog television 102 for later retrieval and display. The television controller 124 of the set top box 100 may also supply control signals to the on-screen generator 112 via ports 126 and 124 to control the formatting performed by the on-screen display generator. The formatting performed by the on-screen display generator 112 and video processors 114 may include any of the formatting methods performed by the digitally enabled analog television 10 of FIG. 1, i.e., the digital data appears in the PIP screen and the analog composite television signal appears in the main display, and vice versa, or the digital data is overlaid on all or a portion of the analog composite television signal in the main display.

Moreover, the television controller 110 disposed in the analog television 102 may provide a pre-defined data packet identification bit sequence supplied in an analog broadcast signal and extracted by the VBI data extractor 108 to the television controller 124 and/or to the digital signal filter 132. This pre-defined data packet identification bit sequence could then be used by the digital signal filter 132 to identify a set of one or more data packets 34 that are to be extracted.

A remote control 134 having components identical to those of remote control 28 of FIG. 5 disposed therein, may be used to enter and encode control signals that are then transmitted to a remote control signal receiver 136 disposed in the set top box 100. The remote control signals are thereafter transmitted to a decoder 138 which decodes the encoded signals and delivers the decoded signals to the controller 124. A remote control 140 communicates with the remote control signal receiver 116 disposed in the analog television 102 and may includes components identical to those disposed in the remote control 28 to the extent that such components are necessary to effect control of the analog television 102. Alternatively, the remote control 134 may be programmed to control of the components of both the analog television 102 and the set top box 100.

The formats in which the digital data may be displayed by the analog television 102 include the methods described for the television 10 of FIG. 1, i.e., the digital data appears in the PIP screen and the analog composite television signal appears in the main display and vice versa, or the digital data is overlaid on all or a portion of the analog composite television signal appearing in the main display. As a result, the remote control 134 includes a set of keys, as described for the remote control 28, that are necessary to effect control such displays. And, of course, to enable a PIP display, the video processors 114 include a PIP module 113 and the circuitry necessary for such a display.

Figure 8:
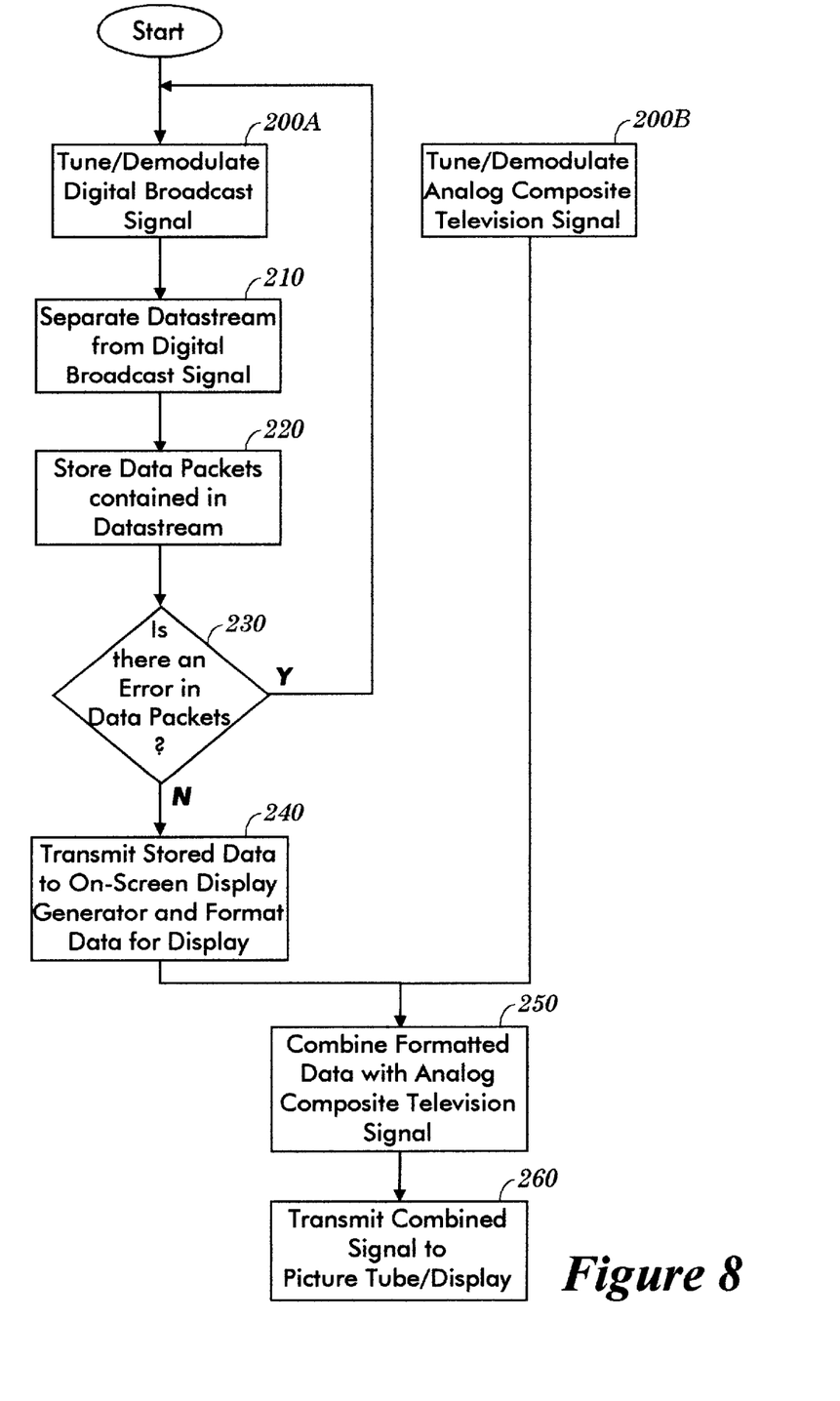
FIG. 8 illustrates a flow chart of a method for retrieving digital data from the digital broadcast signal and for combining the digital data with an analog television composite signal for display on a television monitor according to a still further embodiment of the present invention.

Referring also to FIG. 8, a method for retrieving data at the digitally enabled analog television 10 and for combining the data with the analog composite television signal begins at a block 200A where the digital tuner 24, in response to a digital channel select signal generated by the viewer at the remote control 28 using data key 68, tunes to a digital television channel and receives a digital broadcast television signal therefrom. At the same block, the digital signal demodulator 26 demodulates the received signal. While the digital broadcast television signal is being received and demodulated at the block 200A, in response to an analog channel select signal generated by the viewer at the remote control 28, again using data key 68, the analog tuner 12 is tuned to and receives an analog, composite television signal from an analog broadcast television signal, and the analog signal demodulator 14 demodulates the signal at a block 200B.

After the digital broadcast signal has been received/demodulated at the block 200A, control proceeds to a block 210 where the datastream 36 transmitted in the incoming digital broadcast signal 30 is separated from the digital broadcast signal 30 at the digital signal filter 41. Next, at a block 220, the separated data packets are stored in the RAM 44. Then control proceeds to a block 230 where the data packets stored in the RAM 44 are checked for errors by the television controller 16. If an error is detected, the stored data is erased and control returns to the block 200A where the digital tuner 24 continues to receive the digital broadcast signal. If, instead, no errors are detected, control proceeds to a block 240 where the data is formatted for display by the on-screen display generator 46. After being formatted at the block 240, control flows to a block 250 where the formatted data display is combined with the analog composite television signal received at the block 200B. As indicated in the flow chart, the block 200B is performed concurrently with any or all of the steps of blocks 200A–240.

After the formatted data has been combined with the analog composite television signal, control proceeds to a block 260 where, in response to a display signal generated by depressing display key 76, the combined signal is supplied to the picture tube 20 in accordance with the selection made by the viewer with the display key 76.

As described hereinbefore, the data downloaded from the digital broadcast signal may have been selected for download via an information signal embedded in an analog broadcast signal instead of via a user-entered selection. In the event that information embedded in an analog broadcast signal is used to identify the digital data to be downloaded, then the step of tuning to an analog composite television signal performed at the block 200B will further include separating or extracting the information signal embedded in the analog broadcast signal from the analog broadcast signal and transmitting this information signal to the television controller. In addition, the step of tuning to a digital broadcast signal performed at the block 200A will be modified such that the digital tuner will tune to a channel identified in the information signal that was extracted or separated from the analog broadcast signal at the block 200B. Lastly, the step of separating the data packets from the digital broadcast signal performed at the block 210 will be modified such that the data packets to be separated will be identified using a pre-defined data packet identification bit sequence that was supplied in the information signal that was extracted from the analog broadcast signal at the block 200B.

Certain modifications of the present invention have been discussed above. Other modifications will occur to those practicing in the art of the present invention. For example, as described above, the digital data retrieved from the digital broadcast signal is stored in the RAM 44 for transmission to the on-screen display generator 46 and is subsequently displayed. As such, the data may be displayed immediately or may instead be downloaded and stored in the RAM 44 for display at a later time. Alternatively, the data may be transmitted directly from the digital filter 41 (see FIG. 1) to the on-screen display generator 46 and not stored in the RAM 44 such that it need be displayed immediately or not at all.

In addition, the television controller of the digitally enabled analog television as described above is programmed to check the incoming datastream 28 for errors. Alternatively, the digitally enabled analog television 10 may include a separate error detector (not shown) for performing this function, or may exclude this function altogether.

Moreover, in addition to the PIP and main display formats described above, there are a myriad of other ways in which the digital data may be formatted for display including, for example, as a ticker at the bottom of the display.

Still further, the present invention has been described above, at least in part, in relation to downloading data transmitted in a digital vestigial sideband (VSB) broadcast signal. However, it should be noted that the present invention also is applicable to downloading data transmitted in other types of digital broadcast signals such as COFDM signals, QAM signals, QPSK signals, and/or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A television system comprising:
   an analog tuner, wherein the analog tuner tunes to an analog programming signal;
   an analog signal demodulator coupled to the analog tuner, wherein the analog signal demodulator demodulates the analog programming signal;
   a digital tuner, wherein the digital tuner tunes to a digital programming signal;
   a digital signal demodulator coupled to the digital tuner, wherein the digital signal demodulator demodulates the digital programming signal; and,
   a display coupled to the analog and digital signal demodulators, wherein the display displays analog programming contained in the demodulated analog programming signal, wherein the display displays data as contained in one or more digital data packets transmitted in the digital programming signal, and wherein the analog programming and the data are displayed concurrently.

2. The television system of claim 1 wherein the analog programming signal comprises an analog program component and an analog information component, wherein the analog information component includes information pertaining to a digital channel from which the one or more digital data packets is extracted and further wherein the analog information component includes information pertaining to an identifier for identifying the one or more digital data packets to be extracted from the digital programming signal.

3. The television system of claim 1 further comprising a cabinet, wherein the analog tuner, the analog signal demodulator, the digital tuner, the digital signal demodulator, and the display are contained within the cabinet.

4. The television system of claim 1 further comprising a cabinet, wherein the analog tuner and the analog signal demodulator are contained within the cabinet, and wherein the digital tuner and the digital signal demodulator are external of the cabinet.

5. The television system of claim 1 wherein the display includes a video processor, wherein the video processor is coupled to the analog and digital signal demodulators, and wherein the video processor processes the analog and digital programming signals so as to display the analog programming and the data.

6. The television system of claim 5 wherein the video processor processes the analog and digital programming signals so as to display the data as a overlay of the analog programming.

7. The television system of claim 5 wherein the video processor processes the analog and digital programming signals so as to display one of the data and the analog programming in a PIP and the other of the data and the analog programming in a main display.

8. The television system of claim 7 wherein the video processor processes the analog and digital programming signals so as swap the data and the analog programming between the PIP and the main display.

9. The television system of claim 5 wherein the video processor includes a television controller, wherein the television controller is coupled to the analog and digital tuners, wherein the television controller controls the analog and digital tuners.

10. The television system of claim 9 further comprising a cabinet, wherein the analog tuner, the analog signal demodulator, the digital tuner, the digital signal demodulator, the television controller, and the video processor are contained within the cabinet.

11. The television system of claim 5 wherein the video processor includes first and second television controllers, wherein the first television controller is coupled to the analog tuner, wherein the first television controller controls the analog tuner, wherein the second television controller is coupled to the digital tuner, and wherein the second television controller controls the digital tuner.

12. The television system of claim 11 further comprising a cabinet, wherein the analog tuner, the analog signal demodulator, and the first television controller are contained within the cabinet, and wherein the digital tuner, the digital signal demodulator, and the second television controller are external of the cabinet.

13. The television system of claim 1 further comprising a receiver, wherein the receiver receives control signals from a remote control, and wherein the receiver is coupled to the display so as to control display of the data in relation to analog programming.

14. The television system of claim 13 further comprising a cabinet, wherein the analog tuner, the analog signal demodulator, the digital tuner, the digital signal demodulator, the receiver, and the display are contained within the cabinet.

15. The television system of claim 13 further comprising a cabinet, wherein the receiver comprises first and second receivers, wherein the first and second receivers receive control signals from a remote control, and wherein the first and second receivers are coupled to the display so as to control display of the data in relation to analog programming, wherein the analog tuner, the analog signal demodulator, and the first receiver are contained within the cabinet, and wherein the digital tuner, the digital signal demodulator, and the second receiver are external of the cabinet.

16. The television system of claim 13 wherein the display includes a video processor, wherein the video processor is coupled to the analog and digital signal demodulators and the receiver, and wherein the video processor processes the analog and digital programming signals so as to display the analog programming and the data in response to signals from the receiver.

17. The television system of claim 16 wherein the video processor processes the analog and digital programming signals and the signals from the receiver so as to display the data as an overlay of the analog programming.

18. The television system of claim 16 wherein the video processor processes the analog and digital programming signals and the signals from the receiver so as to display one of the data and the analog programming in a PIP and the other of the data and the analog programming in a main display.

19. The television system of claim 18 wherein the video processor processes the analog and digital programming signals and the signals from the receiver so as swap the data and the analog programming between the PIP and the main display.

20. The television system of claim 16 wherein the video processor includes a television controller, wherein the television controller is coupled to the analog and digital tuners, and the receiver, wherein the television controller controls the analog and digital tuners in response to signals from the receiver.

21. The television system of claim 20 further comprising a cabinet, wherein the analog tuner, the analog signal demodulator, the digital tuner, the digital signal demodulator, the television controller, the receiver, and the video processor are contained within the cabinet.

22. The television system of claim 16 wherein the video processor includes first and second television controllers and first and second receivers, wherein the first television controller is coupled to the analog tuner, and to the first receiver, wherein the first television controller controls the analog tuner in response to signals from the first receiver, wherein the second television controller is coupled to the digital tuner, and to the second receiver, and wherein the second television controller controls the digital tuner in response to signals from the second receiver.

23. The television system of claim 22 further comprising a cabinet, wherein the analog tuner, the analog signal demodulator, the first receiver, and the first television controller are contained within the cabinet, and wherein the digital tuner, the digital signal demodulator, the first receiver, and the second television controller are external of the cabinet.

24. A television system method comprising:
  receiving both an analog program signal and a digital program signal;
  extracting an analog program from the analog program signal;
  displaying the analog program on a display;
  extracting data from data packets in the digital program signal;
  displaying the data concurrently with the analog program on the display.

25. The television system method of claim 24 wherein the analog program signal comprises an analog programming signal component and an analog information signal component, wherein the data extracted from the digital program signal are contained in one or more digital data packets, wherein the analog information signal component includes information pertaining to a digital channel from which the one or more digital packets is extracted, and wherein the analog information signal component includes information pertaining to an identifier, the television system method further comprising identifying the one or more digital data packets to be extracted from the digital program signal based on the identifier.

26. The television system method of claim 24 wherein the analog program signal comprises a first analog program signal, wherein the analog program comprises a first analog program, and wherein the television system method further comprises:

receiving a second analog program signal; and, extracting a second analog program from the second analog program signal; and, displaying the second analog program on the display.

27. A method for receiving a digital broadcast signal and for combining the digital broadcast signal with an analog broadcast signal, the method comprising the steps of:

a) tuning to and receiving the analog broadcast signal;

b) demodulating the analog broadcast signal;

c) tuning to and receiving the digital broadcast signal;

d) demodulating the digital broadcast signal;

e) separating a digital data packet from the digital broadcast signal;

f) formatting data contained in the digital data packet for display, thereby generating a formatted data signal;

g) combining the formatted data signal with the demodulated analog broadcast signal thereby to form a combined signal; and h) supplying the combined signal to a display for display thereon.

28. A method as defined in claim 27 further comprising the steps of:

i) separating an analog information signal from the analog broadcast signal;

j) using information contained in the analog information signal to select a channel for the tuning of step c); and k) using information contained in the analog information signal to identify the data packet to be separated from the digital broadcast signal in step e); wherein the steps i) and j) are to be performed between the steps c) and d) and further wherein the step k) is to be performed between the steps d) and e).

29. A method as defined in claim 27 further comprising the steps of:

i) checking the digital data packet separated from the digital broadcast signal for one or more errors; and j) if an error is detected at the step i), then causing the digital data packet to be discarded and returning to step c); wherein the steps of i) and j) are to be performed between the steps of e) and f) such that if no error is detected then the method continues at the step f).

* * * * *